(12) United States Patent
Lenox

(10) Patent No.: US 8,661,753 B2
(45) Date of Patent: Mar. 4, 2014

(54) WATER-RESISTANT APPARATUSES FOR PHOTOVOLTAIC MODULES

(75) Inventor: Carl J. S. Lenox, Oakland, CA (US)

(73) Assignee: SunPower Corporation, San Jose, CA (US)

(*) Notice: Subject to any disclaimer, the term of this patent is extended or adjusted under 35 U.S.C. 154(b) by 639 days.

(21) Appl. No.: 12/882,793

(22) Filed: Sep. 15, 2010

(65) Prior Publication Data

US 2011/0113704 A1    May 19, 2011

Related U.S. Application Data

(60) Provisional application No. 61/261,730, filed on Nov. 16, 2009.

(51) Int. Cl.
*E04D 13/143* (2006.01)
*E04D 13/17* (2006.01)
*E04D 13/18* (2006.01)

(52) U.S. Cl.
USPC ........ 52/302.1; 52/302.3; 52/173.3; 454/366; 454/367

(58) Field of Classification Search
None
See application file for complete search history.

(56) References Cited

U.S. PATENT DOCUMENTS

| | | | | |
|---|---|---|---|---|
| 3,662,503 A * | 5/1972 | Praisler | | 52/97 |
| 4,227,515 A * | 10/1980 | Jacob et al. | | 126/592 |
| 4,237,861 A * | 12/1980 | Fayard et al. | | 126/622 |
| 5,038,674 A * | 8/1991 | Merges | | 454/136 |
| 5,338,369 A | 8/1994 | Rawlings | | |
| 5,473,847 A * | 12/1995 | Crookston | | 52/302.1 |
| 5,571,338 A | 11/1996 | Kadonome et al. | | |
| 5,738,581 A * | 4/1998 | Rickert et al. | | 454/365 |
| 6,061,978 A * | 5/2000 | Dinwoodie et al. | | 52/173.3 |
| 6,182,404 B1 | 2/2001 | Rinklake et al. | | |
| 6,450,882 B1 * | 9/2002 | Morris et al. | | 454/365 |
| 6,491,579 B1 * | 12/2002 | O'Hagin | | 454/250 |
| 6,541,693 B2 * | 4/2003 | Takada et al. | | 136/244 |
| 6,570,084 B2 | 5/2003 | Dinwoodie | | |
| 6,793,574 B1 | 9/2004 | Robinson | | |
| 6,800,801 B2 * | 10/2004 | Sasaoka et al. | | 136/246 |
| 7,328,534 B2 | 2/2008 | Dinwoodie | | |
| 7,618,310 B2 * | 11/2009 | Daniels | | 454/366 |
| 8,209,919 B2 * | 7/2012 | Beck | | 52/173.3 |
| 8,276,329 B2 * | 10/2012 | Lenox | | 52/173.3 |
| 2004/0000334 A1 * | 1/2004 | Ressler | | 136/251 |

(Continued)

FOREIGN PATENT DOCUMENTS

| | | |
|---|---|---|
| WO | WO-01/90614 A2 | 11/2001 |
| WO | WO-2006/028698 A1 | 3/2006 |
| WO | WO 2008/153936 | 12/2008 |

OTHER PUBLICATIONS

"International Application Serial No. PCT/US2010/048953, Search Report and Written Opinion mailed Nov. 15, 2010", 19 pgs.

(Continued)

*Primary Examiner* — Phi A
(74) *Attorney, Agent, or Firm* — Knobbe Martens Olson & Bear LLP

(57) ABSTRACT

A water-resistant apparatus is provided. This water-resistant apparatus is positioned near a photovoltaic module. The water-resistant apparatus includes hollow, elongated conduits, and each conduit can hold water with surface tension based on exposure of the conduit to water. The surface tension causes a formation of a meniscus that inhibits a flow of water through the conduit.

12 Claims, 9 Drawing Sheets

(56) References Cited

U.S. PATENT DOCUMENTS

| | | |
|---|---|---|
| 2004/0140002 A1 | 7/2004 | Brown et al. |
| 2004/0163338 A1 | 8/2004 | Liebendorfer |
| 2004/0187909 A1 | 9/2004 | Sato et al. |
| 2005/0217716 A1 | 10/2005 | Masuda et al. |
| 2006/0086382 A1 | 4/2006 | Plaisted |
| 2007/0157963 A1 | 7/2007 | Metten et al. |
| 2007/0295391 A1 | 12/2007 | Lenox et al. |
| 2008/0035140 A1* | 2/2008 | Placer et al. ............... 126/622 |
| 2008/0289679 A1* | 11/2008 | Ressler ..................... 136/244 |
| 2009/0242014 A1 | 10/2009 | Leary |
| 2010/0236609 A1* | 9/2010 | Tweedie ..................... 136/251 |
| 2011/0113704 A1* | 5/2011 | Lenox ....................... 52/173.3 |
| 2011/0114158 A1 | 5/2011 | Lenox |

OTHER PUBLICATIONS

International Search Report and Written Opinion in PCT Application PCT/US2010/051769, mailed Nov. 29, 2010.

* cited by examiner

SECTION A-A

WATER-RESISTANT APPARATUSES FOR PHOTOVOLTAIC MODULES

CROSS-REFERENCES TO RELATED APPLICATIONS

This application claims the benefit of U.S. Provisional Application No. 61/261,730, entitled "Roof Coverings," filed Nov. 16, 2009, the disclosure of which is incorporated herein by reference.

STATEMENT REGARDING STATE SPONSORED RESEARCH OR DEVELOPMENT

The invention was made with State of California support under California Energy Commission Contract Number 500-04-009. The Energy Commission has Certain Rights to this Invention.

FIELD

The present disclosure relates generally to photovoltaic modules. In an embodiment, the disclosure relates to water-resistant apparatuses for photovoltaic modules.

BACKGROUND

Photovoltaic modules can be secured to roofs, but the modules must be designed and mounted in such a way that they can withstand sufficiently high wind speeds. Furthermore, water can penetrate between the photovoltaic modules and, for example, corrode the mounts that secure the photovoltaic modules to the roofs. One traditional technique to waterproof an array of photovoltaic modules is to fit covers over spaces between the photovoltaic modules to prevent water from penetrating through these spaces. However, many of these coverings cause pressure differences between a cavity underneath the photovoltaic modules and the atmosphere. As a result of the pressure difference, high winds can more easily dislodge the photovoltaic modules from the roof and accordingly, the mounts and/or the photovoltaic modules for use on roofs need to be designed to be stronger and heavier to accommodate the extra forces created by the pressure difference.

SUMMARY

In an embodiment, a water-resistant apparatus is provided. This water-resistant apparatus is positioned near a photovoltaic module. The water-resistant apparatus includes hollow, elongated conduits, and each conduit can hold water with surface tension based on exposure of the conduit to water. The surface tension causes a formation of a meniscus that inhibits a flow of water through the conduit.

In another embodiment, a photovoltaic module is provided. This photovoltaic module has a surface bound by an edge and includes a water-resistant apparatus coupled to this surface and located along this edge. The water-resistant apparatus includes hollow, elongated conduits, and each conduit holds water with surface tension based on exposure of the conduit to water. Again, the surface tension causes a formation of a meniscus that inhibits a flow of water through the conduit.

In yet another embodiment, a system of a plurality of photovoltaic modules is provided. This system includes a first photovoltaic module and a second photovoltaic module disposed above and overlapping a portion of the first photovoltaic module. This disposition forms a gap between the first and second photovoltaic modules along the portion of the first photovoltaic module. A water-resistant apparatus is fitted within the gap, and this water-resistant apparatus includes hollow, elongated conduits.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The following description and the drawings illustrate specific embodiments of the invention sufficiently to enable those skilled in the art to practice them. Other embodiments can incorporate structural, logical, electrical, process, and other changes. Examples merely typify possible variations. Individual components and functions are optional unless explicitly required, and the sequence of operations can vary. Portions and features of some embodiments can be included in or substituted for those of others. Embodiments of the invention set forth in the claims encompass all available equivalents of those claims. Embodiments of the invention can be referred to, individually or collectively, herein by the term "invention" merely for convenience and without intending to limit the scope of this application to any single invention or inventive concept if more than one is in fact disclosed.

Figure 1:
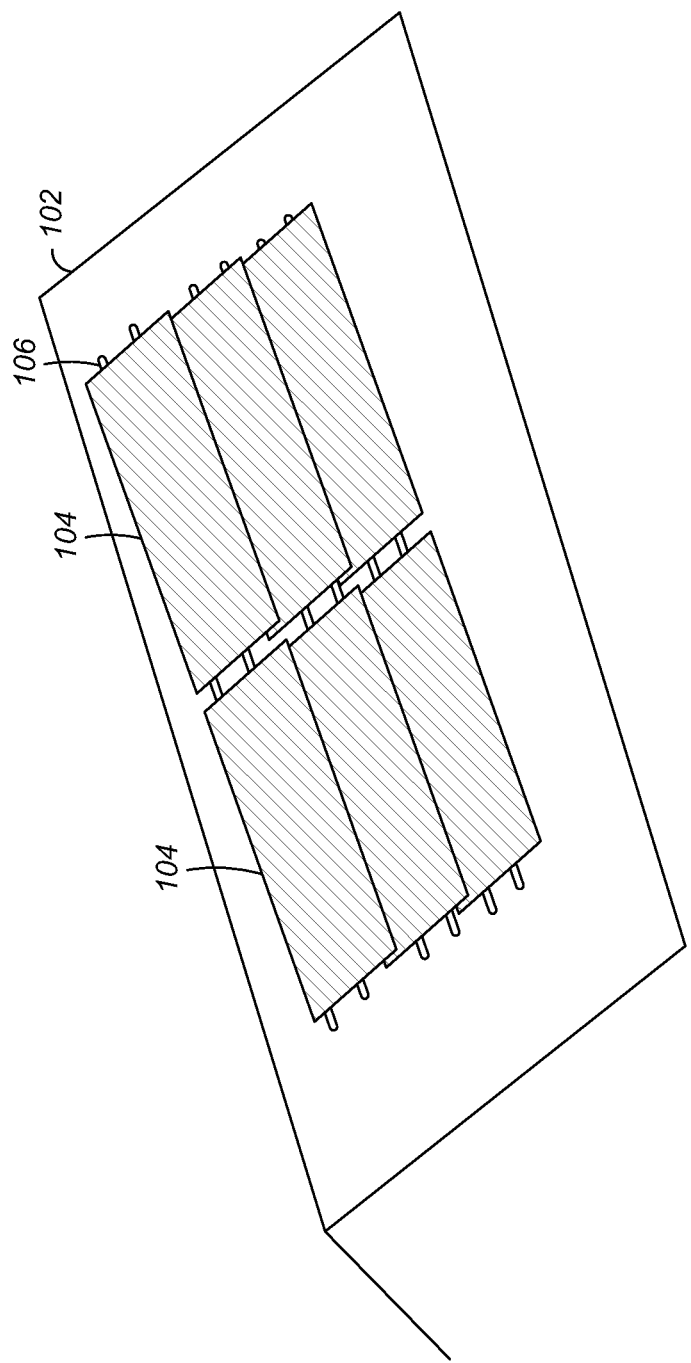
FIG. 1 depicts an array or system of photovoltaic modules mounted on a roof.

A photovoltaic module is a packaged interconnected assembly of solar cells (or photovoltaic cells), and FIG. 1 depicts an array or system of photovoltaic modules 104 mounted on a roof 102. In this example, the photovoltaic modules 104 are secured to the roof 102 with rack systems that include vertical stanchions and lateral rails 106. In a rainstorm, the photovoltaic modules 104 shield the roof 102 from exposure to water. However, water can penetrate through gaps between the photovoltaic modules 104. For example, instead of falling directly onto the sun-facing surfaces of the photovoltaic modules 104, rain can be blown laterally in a rainstorm such that it enters through gaps between the overlapping edges of the photovoltaic modules 104.

Figure 2:
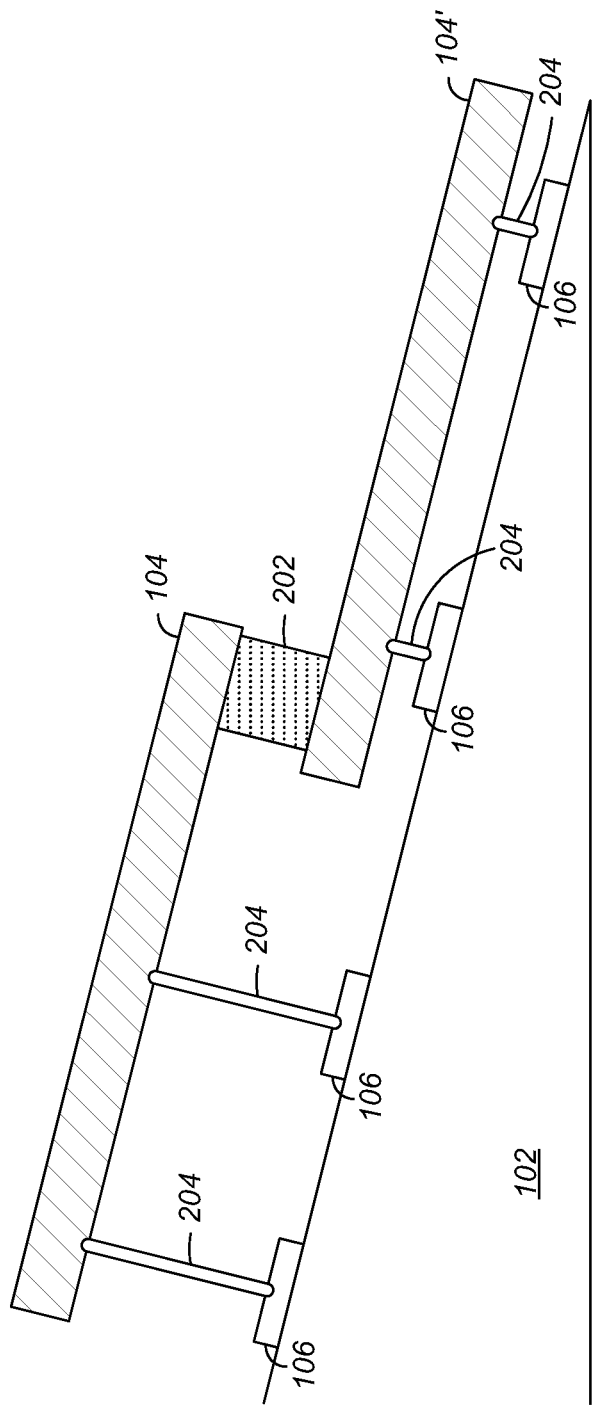
FIG. 2 depicts a side view of an array of photovoltaic modules mounted on the roof.

Embodiments of the present invention describe the use of examples of different water-resistant apparatus to waterproof the photovoltaic modules 104. FIG. 2 depicts a side view of an array of photovoltaic modules 104 and 104' mounted on the roof 102, consistent with an embodiment of the present invention. Again, the photovoltaic modules 104 and 104' are secured to the roof 102 with rack systems that include vertical stanchions 204 and lateral rails 106.

In this example, the photovoltaic module 104 is located above and overlaps a portion of the photovoltaic module 104', so that an edge of the module 104 is located beyond and at the edge of module 104', when seen in top view. This overlap and vertical spacing results in a gap between the photovoltaic modules 104 and 104'. In the embodiment depicted in FIG. 2, a water-resistant apparatus 202 is positioned in the gap between the photovoltaic modules 104 and 104' to inhibit water from penetrating the gap. As explained in more detail below, the water-resistant apparatus 202 can inhibit water penetration through use of hollow, elongated conduits.

Figure 3A:
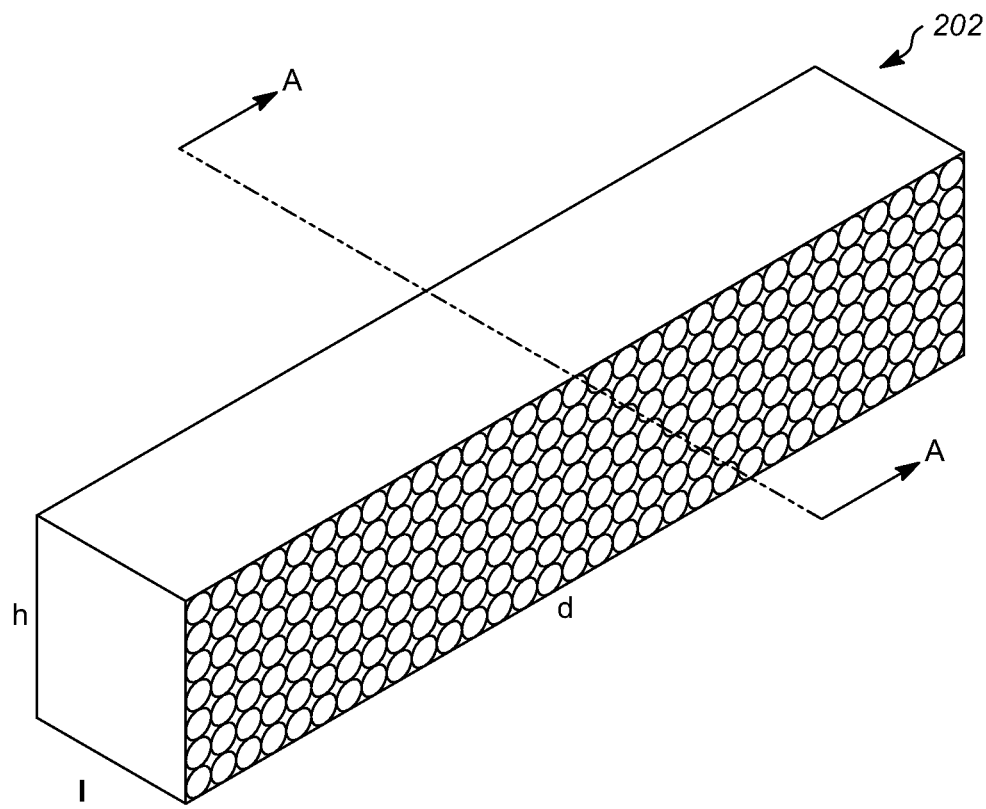
FIG. 3A depicts a three-dimensional view of an embodiment of a water-resistant apparatus.

FIG. 3A depicts a three-dimensional view of an embodiment of a water-resistant apparatus 202. The water-resistant apparatus 202 is composed of rows of hollow, elongated conduits that are vertically stacked on top of each other and extend through the apparatus 202 in a direction transverse to a length l of the apparatus 202. As used herein, a "hollow, elongated conduit" refers to a hollow, enclosed structure having openings at two ends for conveying liquid and/or air.

The water-resistant apparatus 202 has a length l, height h, and depth d. The height h can be of any suitable height. In one embodiment, the water-resistant apparatus 202 is fitted within a gap formed between photovoltaic modules or between a photovoltaic module and some type of surface, and therefore, the length l and height h can be dimensioned to fit within the gap. Given that the water-resistant apparatus 202 can be fitted along an edge of a photovoltaic module, the depth d can span a length of such an edge. However, it should be appreciated that the length l is at least greater than a diameter of a hollow, elongated conduit. Since many photovoltaic modules have edges that are much longer than a height of the gap, the water-resistant apparatus 202 depicted in FIG. 3A is shaped like a rectangular bar. However, in other embodiments, the water-resistant apparatus 202 can have a variety of other different shapes. For example, in an alternate embodiment, the water-resistant apparatus 202 can be shaped as a cube. In yet another embodiment, the water-resistant apparatus 202 can be shaped as a cylinder.

Figure 3B:
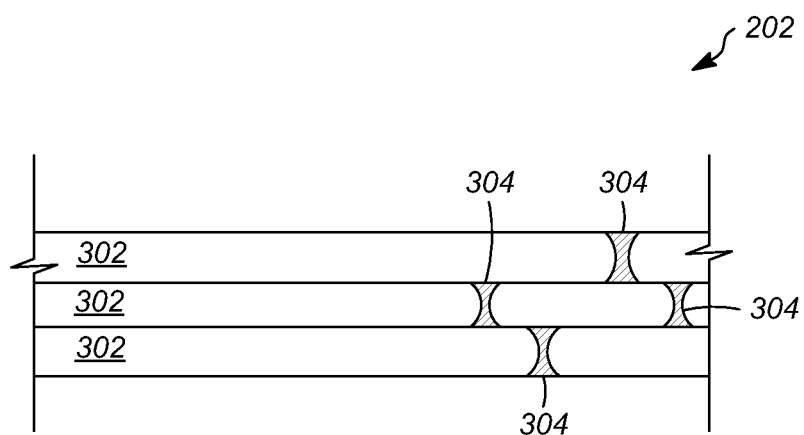
FIG. 3B depicts a sectional view of the water-resistant apparatus along a cut plane A-A depicted in FIG. 3A.

FIG. 3B depicts a sectional view of the water-resistant apparatus 202 along a cut plane A-A depicted in FIG. 3A. The water-resistant apparatus 202 includes vertically stacked rows of hollow, elongated conduits 302. The conduits 302 are shaped and dimensioned to hold water with surface tension within the conduits 302 when the conduits 302 are exposed to water. It should be noted that the terms "hollow, elongated conduit" and "conduit" can be used interchangeably. As depicted in FIG. 3B, the surface tension within the conduits 302 causes formations of menisci 304 that inhibit further flow of water through the conduits 302. In other words, the menisci 304 formed within the conduits 302 completely block the openings within the conduits 302 and therefore, can inhibit or completely prevent additional water from flowing through the conduits 302.

Each conduit 302 defines an internal void, passage, or opening, which is dimensioned such that it accommodates the formation of a meniscus 304 when exposed to water. In one embodiment, a conduit 302 can have an opening having a constant cross-sectional outline and having a maximum cross-sectional dimension (e.g., a diameter) of between about 0.1 inches (2.54 mm) and about 0.4 inches (10.16 mm). A "diameter," as used herein, refers to a straight line connecting the center of any suitable geometric figure with two points on the perimeter or surface. As used herein, the term "about" means that the specified dimension or parameter can be varied within an acceptable manufacturing tolerance for a given application. In some embodiments, the acceptable manufacturing tolerance is ±10%.

Figure 4A:
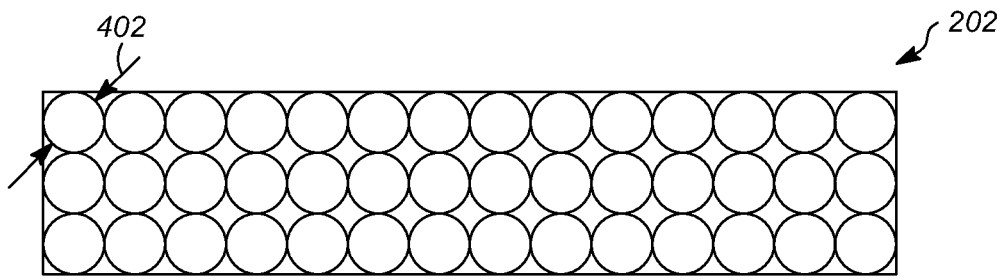
FIGS. 4A, 4B, 4C, and 4D depict various embodiments of water-resistant apparatuses.
Figure 4B:
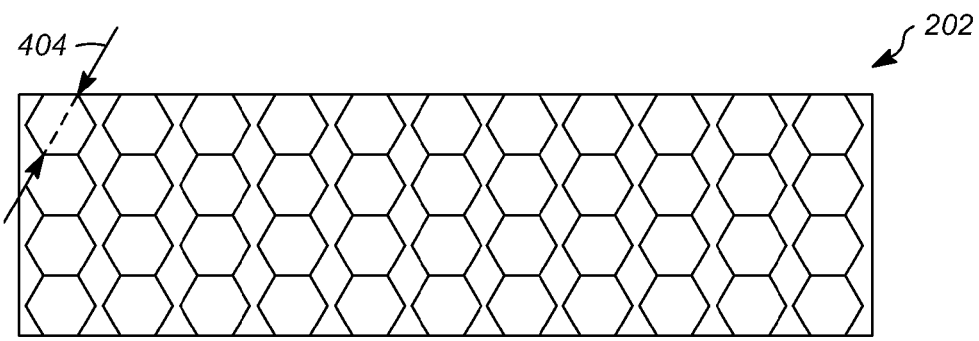
Figure 4C:
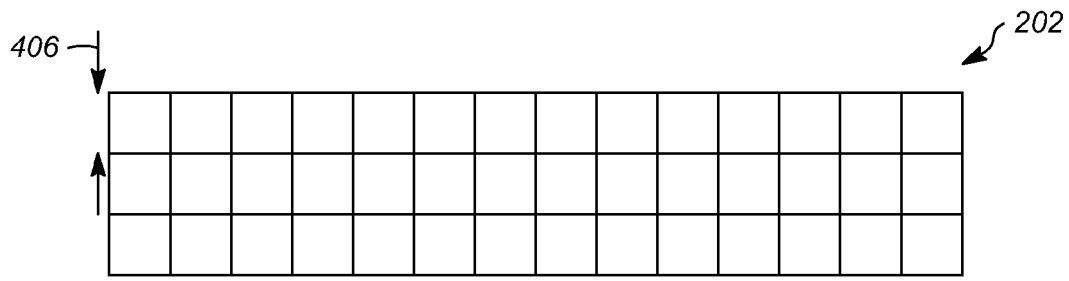
Figure 4D:
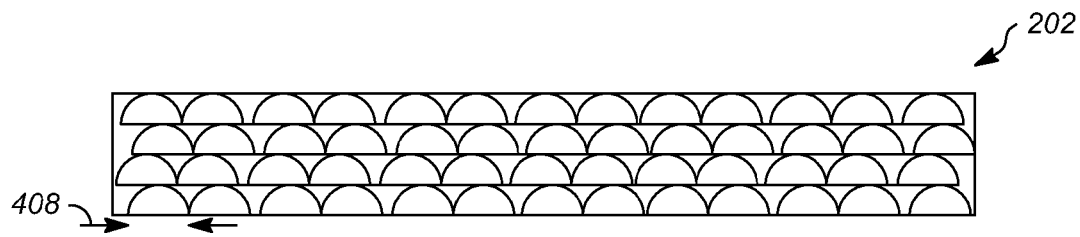

FIGS. 4A, 4B, 4C, and 4D depict various embodiments of water-resistant apparatuses 202. It should be appreciated that the hollow, elongated conduits can have a variety of different shapes. For example, FIG. 4A depicts a front view of an embodiment of a water-resistant apparatus composed of vertically stacked cylindrical tubes. Here, each cylindrical tube can have a diameter 402 between about 0.1 inches and about 0.4 inches. FIG. 4B depicts a front view of a different embodiment of a water-resistant apparatus 202 composed of vertically stacked hexagonal tubes. Here, each hexagon tube can have a longest diameter 404 (or a maximum cross-sectional dimension) between about 0.1 and about 0.4 inches. FIG. 4C depicts a front view of another embodiment of a water-resistant apparatus 202 composed of vertically stacked rectangular tubes. In this embodiment, each rectangular tube 406 can have a side length between about 0.1 inches and about 0.4 inches. FIG. 4D depicts yet another embodiment of a water-resistant apparatus 202 composed of conduits formed from fluted, corrugated sheets. Again, in this embodiment, the longest diameter 408 of each conduit can be between about 0.1 and about 0.4 inches.

Figure 5A:
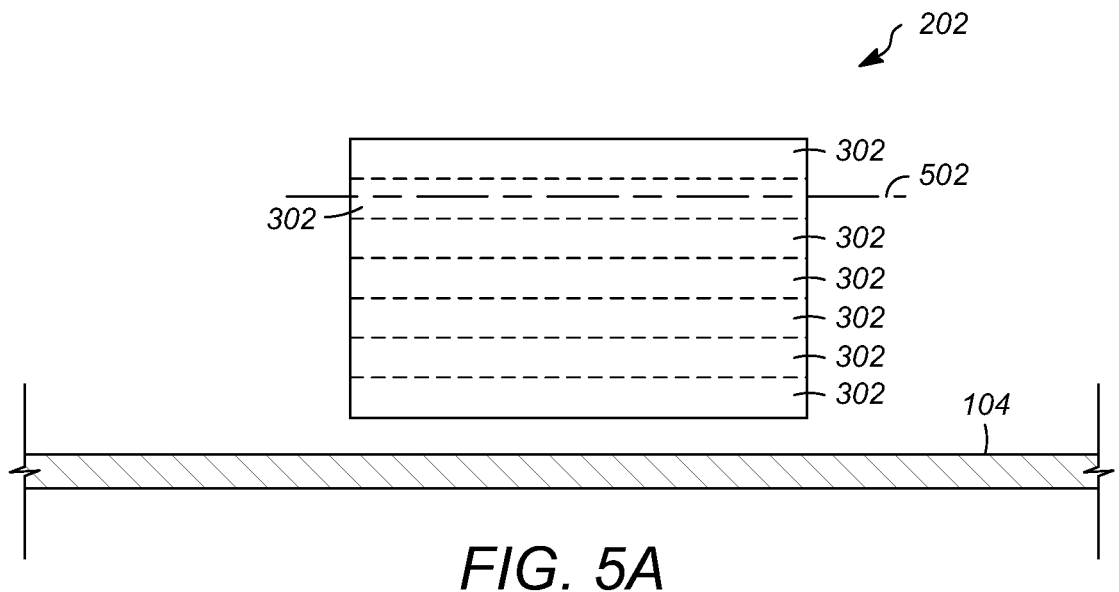
FIGS. 5A and 5B depict side views of two different embodiments of water-resistant apparatuses.
Figure 5B:
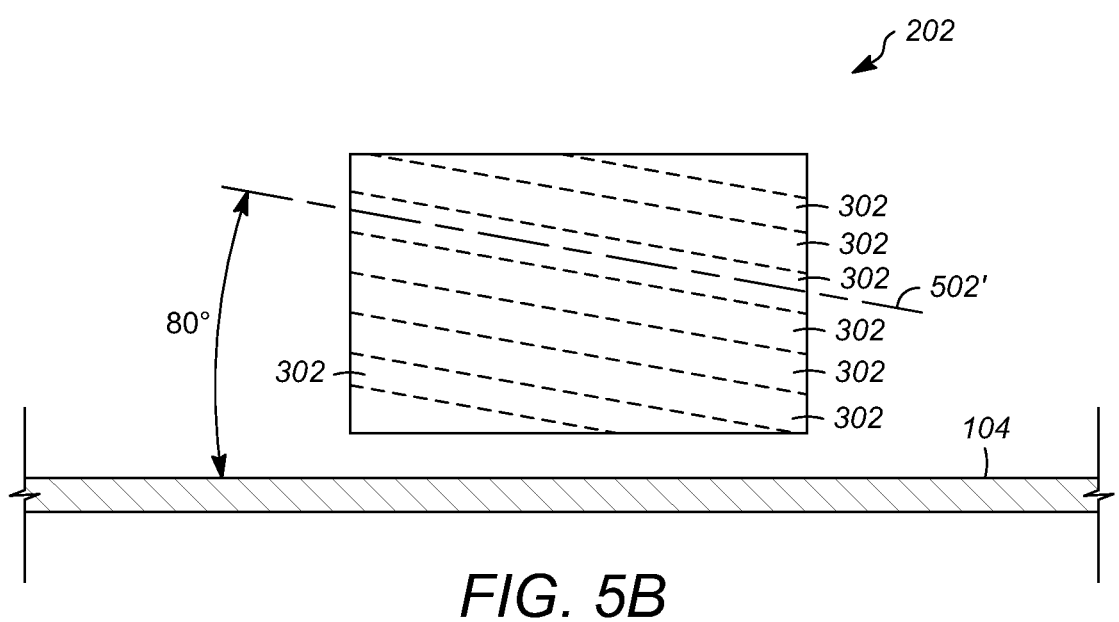

FIGS. 5A and 5B depict side views of two different embodiments of water-resistant apparatuses 202. The water-resistant apparatuses 202 are composed of vertically stacked conduits 302 and each conduit 302 has an axis (e.g., axes 502 and 502') aligned along a length of the conduit 302. As depicted, both water-resistant apparatuses 202 are placed relative to a surface of a photovoltaic module 104. The surface can be a sun-facing surface or a surface that is opposite to the sun-facing surface, which is referred to as a "non sun-facing surface."

In the embodiment depicted in FIG. 5A, the conduits 302 are aligned such that their axes 502 are substantially parallel to the surface of the photovoltaic module 104. In the other embodiment depicted in FIG. 5B, the conduits 302 are aligned such that their axes 502' are aligned to be less than about 80° in reference to the surface. The sloped alignment of the conduits 302 can possibly further enhance the water-resistant properties of the water-resistant apparatus 202 because the flow water has to travel upwards, which is against gravity.

Figure 6:
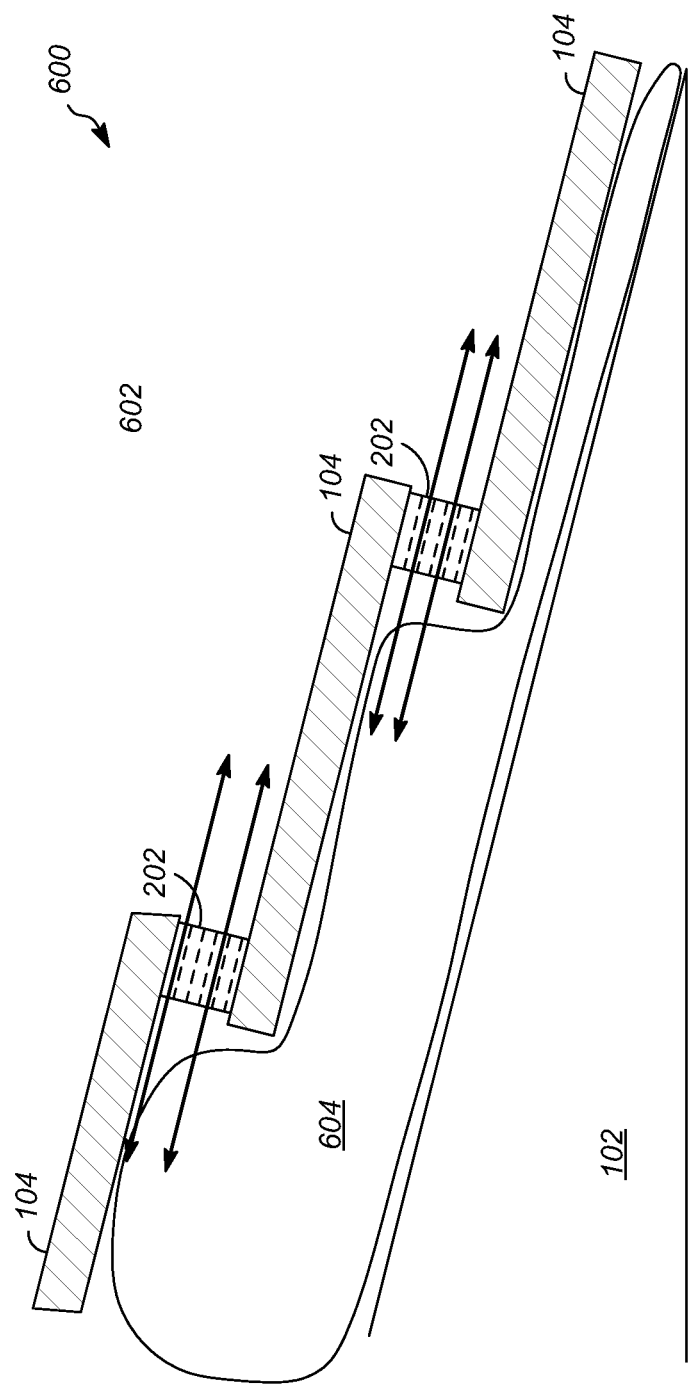
FIG. 6 depicts the use of the water-resistant apparatuses for pressure equalization in a system of photovoltaic modules.

FIG. 6 depicts the use of the water-resistant apparatuses 202 for pressure equalization in a system of photovoltaic modules 104. The system 600 includes multiple photovoltaic modules 104 stacked on top of each other and mounted on a sloped roof 102. Fitted within the gaps between the photovoltaic modules 104 are water-resistant apparatuses 202, as described above. As depicted, a space 604 or cavity is formed between the sloped roof 102 and the photovoltaic modules 104. It should be appreciated that this space 604 can be at a different pressure than atmospheric pressure 602. For example, a temperature difference between the space 604 and areas outside the space 604 can cause a pressure difference. If the pressure in space 604 is not equal to atmospheric pressure, the pressure difference can generate lift on the photovoltaic modules 104, thereby possibly dislodging the photovoltaic modules 104 from the sloped roof 102.

However, the conduits within the water-resistant apparatus 202 are hollow and therefore, the conduits can convey a flow of air either into or out from the space 604 such that the pressure in the space 604 equalize with atmospheric pressure 602. For example, if the pressure in space 604 is higher than atmospheric pressure, then the pressure can force air within space 604 to flow out of the conduits such that the pressure equalizes with atmospheric pressure 602. In another example, if the atmospheric pressure in space 604 is lower than atmospheric pressure 602, then atmospheric pressure 602 can force air from the outside into and through the conduits such that the pressure in space 604 equalizes with the atmospheric pressure 602.

Even when menisci are formed within the conduits, a sufficient pressure difference can overcome the blockage created by the menisci such that a flow of air can be conveyed out from the water-resistant apparatuses 202 when exposed to water. As a result, the water-resistant apparatuses 202 are designed to inhibit the flow of water while at the same time allowing pressure in space 604 to equalize with the atmospheric pressure. The pressure differentials at any given wind speed can therefore be reduced with the use of water-resistant apparatuses 202. Accordingly, the photovoltaic modules 104 and/or mounts can be designed to be lighter and less durable.

Figure 7A:
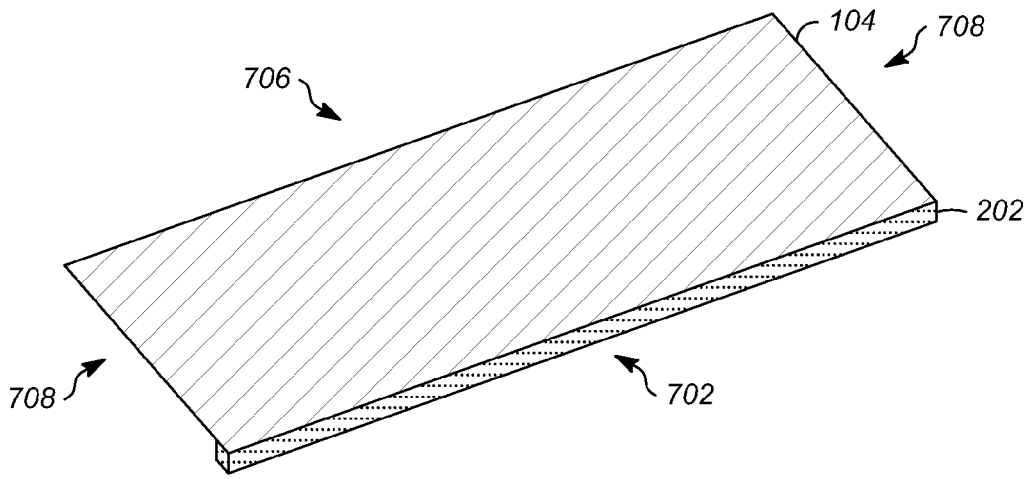
FIGS. 7A, 7B, and 7C depict various embodiments of photovoltaic modules with attached water-resistant apparatuses.
Figure 7B:
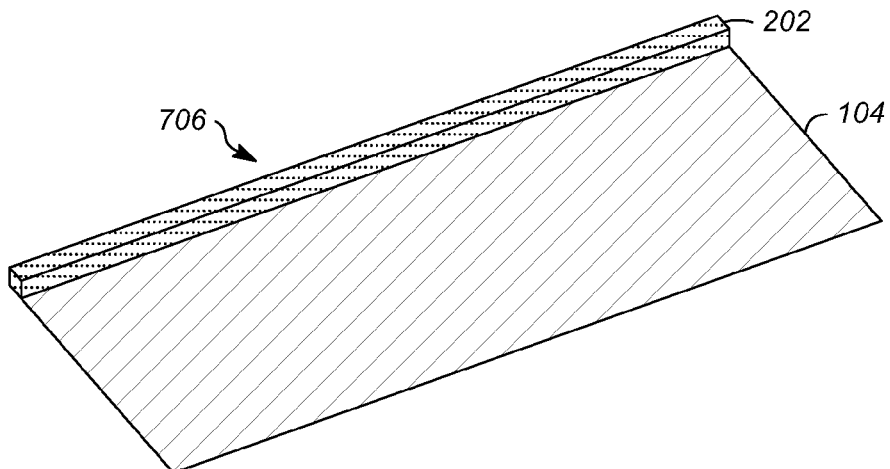
Figure 7C:
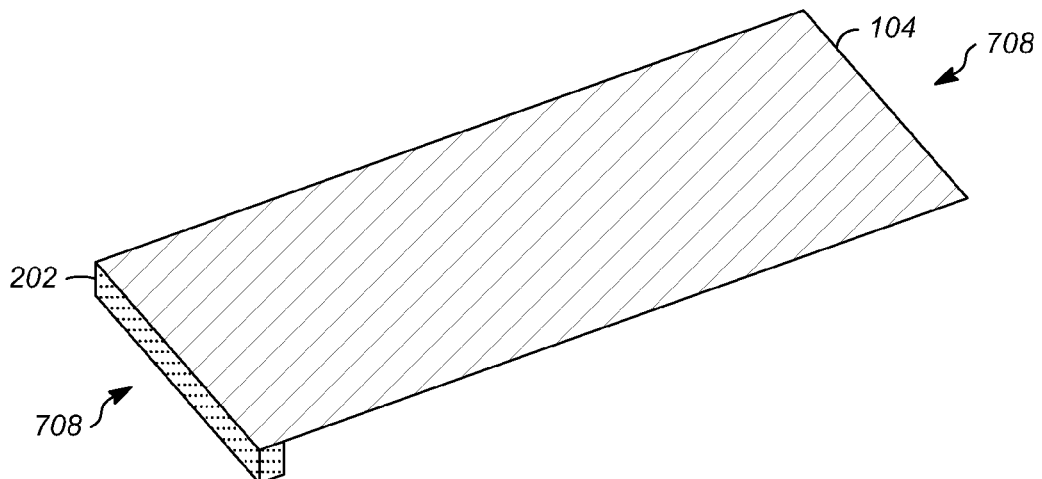

FIGS. 7A, 7B, and 7C depict various embodiments of photovoltaic modules 104 with attached water-resistant apparatuses 202. As depicted in FIG. 7A, the photovoltaic module 104 has a leading edge 702, a trailing edge 706, and side edges 708. A leading edge 702 (or "head lap") is a forward edge of the photovoltaic module 104 that faces a drip edge of a roof. The trailing edge 706 is an edge opposite to the leading edge 702 and, for example, can face a ridge of a sloped roof. The side edges 708 are edges that connect to both the leading edge 702 and the trailing edge 706.

In one embodiment, as depicted in FIG. 7A, the water-resistant apparatus 202 is attached to a non sun-facing surface of the photovoltaic module 104 and is located along the leading edge 702 of the photovoltaic module 104. In the alternative embodiment depicted in FIG. 7B, the water-resistant apparatus 202 is attached to a sun-facing surface of the photovoltaic module 104 and is located along the trailing edge 706 of the photovoltaic module 104. Additionally, the water-resistant apparatus 202 can also be located along one or more side edges 708 of the photovoltaic module 104. For example, as depicted in the embodiment illustrated in FIG. 7C, the water-resistant apparatus 202 is attached to a non sun-facing surface and located along one of the side edges 708.

Figure 8:
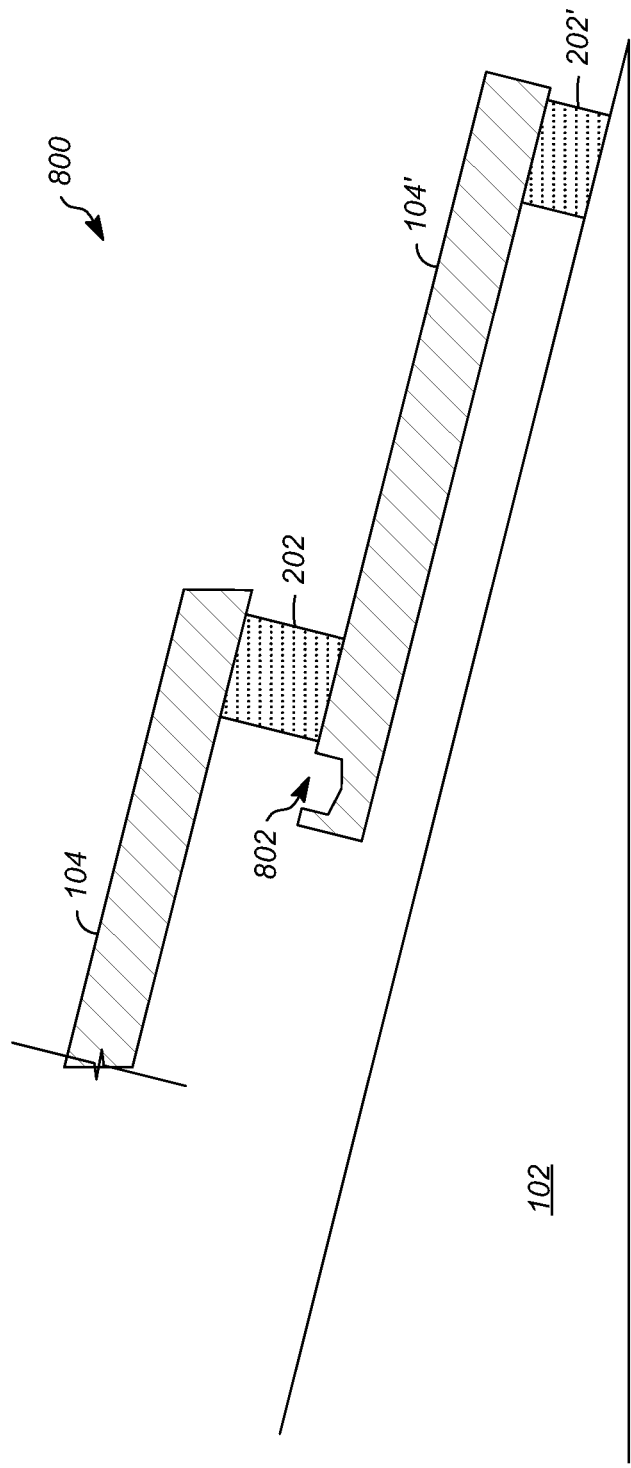
FIG. 8 depicts a side view of a system of photovoltaic modules mounted on a sloped roof, consistent with yet another embodiment of the present invention.

FIG. 8 depicts a side view of a system of photovoltaic modules 104 mounted on a sloped roof 102, consistent with yet another embodiment of the present invention. The system 800 includes multiple photovoltaic modules 104 mounted on a sloped roof 102. Additionally, water-resistant apparatuses 202 and 202' are fitted within the gaps between the overlap of photovoltaic modules 104 and 104' and between a surface of the sloped roof 102 and the photovoltaic module 104'. In this embodiment, the photovoltaic module 104' has a channel 802 located along a trailing edge of the photovoltaic module 104'. This channel 802 can be cut into a sun-facing surface of the photovoltaic module 104' and can be located near the water-resistant apparatus 202. This channel 802 can have a variety of different shapes, such as a half circle, a rectangle, a triangle, or other suitable shapes.

This channel 802 collects any water that flows through the water-resistant apparatus 202 and carries the water to a side edge of the photovoltaic module 104'. As a result, this channel 802 can further facilitate the waterproofing of a system 800 of photovoltaic modules 104 and 104' because it minimizes the amount of water leaked onto the sloped roof 102.

Figure 9:
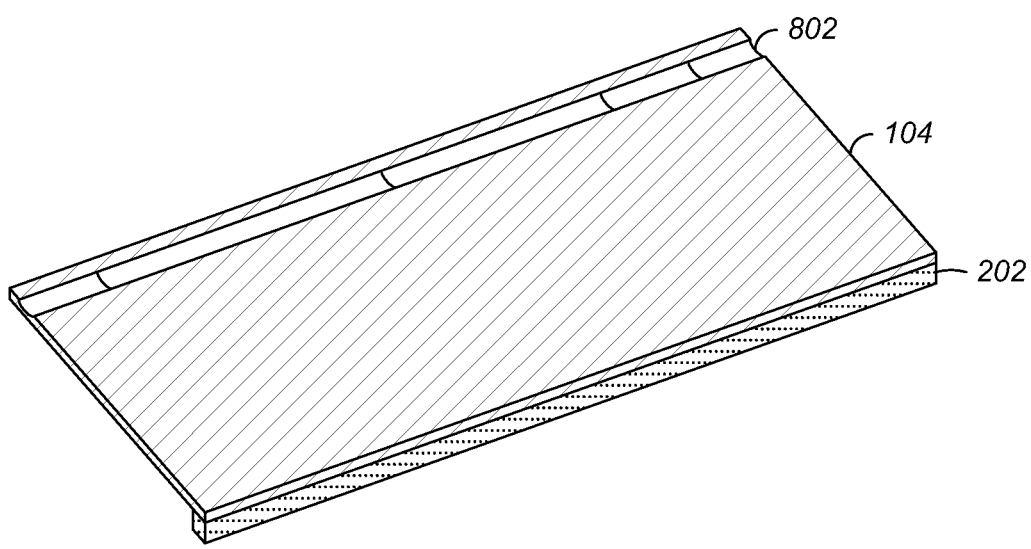
FIG. 9 depicts a three-dimensional view of a photovoltaic module having both a channel and a water-resistant apparatus, consistent with yet another embodiment of the present invention.

FIG. 9 depicts a three-dimensional view of a photovoltaic module 104 having both a channel 802 and a water-resistant apparatus 202, consistent with yet another embodiment of the present invention. As depicted, the photovoltaic module 104 has a water-resistant apparatus 202 attached to a non sun-facing surface along and near a leading edge of the photovoltaic module 104. The photovoltaic module 104 also has a channel 802 located along and near a trailing edge of the photovoltaic module 104. This channel 802 is cut into the sun-facing surface and, as discussed above, collects excess water leaked through another water-resistant apparatus (not shown), which is located near the channel 802, and carries this water to the side edges of the photovoltaic module 104. In one example, one or more of the side edges of the photovoltaic module 104 can be placed near an edge of the roof such that the channel 802 carries the water towards the edge and away from a surface of the roof. Alternatively, the photovoltaic module 104 can be placed such that its channel 802 connects to another channel (not shown) that carries water towards an edge of a roof.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each. Rather, as the following claims reflect, the invention can lie in less than all features of a single disclosed embodiment. Thus the following claims are hereby incorporated into the detailed description, with each claim standing on its own as a separate preferred embodiment.

Plural instances can be provided for components, operations or structures described herein as a single instance. Finally, boundaries between various components, operations, and data stores are somewhat arbitrary, and particular operations are illustrated in the context of specific illustrative configurations. Other allocations of functionality are envisioned and can fall within the scope of the invention(s). In general, structures and functionality presented as separate components in the exemplary configurations can be implemented as a combined structure or component. Similarly, structures and functionality presented as a single component can be implemented as separate components. These and other variations, modifications, additions, and improvements fall within the scope of the invention(s).

What is claimed is:

1. A system of a plurality of photovoltaic modules, the system comprising:
    a first photovoltaic module disposed above a sloped roof, the first photovoltaic module having a top surface configured to face the sun;
    a second photovoltaic module disposed above the sloped roof, the second photovoltaic module having a top surface configured to face the sun and a bottom surface opposite the top surface, the second photovoltaic module disposed above and overlapping a portion of the first photovoltaic module such that at least a portion of the bottom surface of the second photovoltaic module is above at least a portion of the top surface of the first photovoltaic module, the disposition forming a gap between the top surface of the first photovoltaic module and the bottom surface of the second photovoltaic modules along the overlapping portion of the first photovoltaic module; and
    a water-resistant apparatus fitted within the gap, the water-resistant apparatus comprising a plurality of hollow, elongated conduits extending through the gap wherein each conduit is configured to hold water with surface tension based on exposure of each conduit to the water, with the surface tension causing a formation of a meniscus that inhibits a flow of water through each conduit and onto the sloped roof.

2. The system of claim 1, wherein the meniscus formed within the each conduit completely blocks an opening within the each conduit.

3. The system of claim 1, wherein the each conduit has an opening with a diameter between about 0.1 inches and about 0.4 inches.

4. The system of claim 1, wherein the plurality of hollow, elongated conduits comprises a plurality of cylindrical tubes.

5. The system of claim 1, wherein the plurality of hollow, elongated conduits comprises a plurality of rectangular tubes.

6. The system of claim 1, wherein the plurality of hollow, elongated conduits comprises a plurality of hexagonal tubes.

7. The system of claim 1, wherein the plurality of hollow, elongated conduits is formed from a plurality of fluted, corrugated sheets.

8. The system of claim 1, wherein each conduit has an opening that is dimensioned to accommodate the formation of the meniscus based on the exposure of each conduit to the water.

9. The system of claim 1, wherein a space is formed between the sloped roof and the first and second photovoltaic modules; and
wherein each conduit is configured to convey a flow of air into and out from the space in an equalization between a pressure associated with the space and an atmospheric pressure.

10. The system of claim 1, wherein each conduit has an axis, wherein the first photovoltaic module has a sun-facing surface, and wherein the axis is aligned substantially parallel to the sun-facing surface.

11. The system of claim 1, wherein each conduit has an axis, wherein the first photovoltaic module has a sun-facing surface; and
wherein the axis is aligned less than about 80 degrees in reference to the sun-facing surface.

12. The system of claim 1, wherein the first photovoltaic module comprises a channel located along the overlapping portion and proximate to the water-resistant apparatus, with the channel configured to collect water that flows through the plurality of hollow, elongated conduits.

* * * * *